Patented Aug. 5, 1952

2,606,128

UNITED STATES PATENT OFFICE 2,606,128

NONHYDRATING SETTING AND BINDING MATERIAL

Herman Weber, Harriman, Tenn.

No Drawing. Application March 25, 1949,
Serial No. 83,519

3 Claims. (Cl. 106—89)

This invention relates to a non-hydrating setting and binding material and to a process of manufacturing the same. More particularly, the invention relates to a quick-setting, non-hydrating composition of matter made from the natural mineral anhydrite.

Anhydrite, when finely divided, is incapable of hydrating or setting to a bound cast or body after being mixed with water and allowed to dry. Numerous attempts have been made to treat anhydrite so as to enable it to hydrate and to use such anhydrite for the manufacture of plaster or other materials capable of setting when mixed with water. Such previous attempts have not been commercially successful.

It is an object of this invention to provide an anhydrous composition of matter, made from the natural mineral anhydrite capable of setting into a hard, dense mass, if treated with water. Another object is to provide a method of treating anhydrite so as to produce a non-hydrating, cementitious material capable of setting and forming masses having relatively higher compressive strength than other hydrating, cementitious materials containing calcium sulphate, e. g. calcined gypsum ($CaSO_4.\frac{1}{2}H_2O$).

A further object of this invention is to provide a composition of matter which utilizes the mineral anhydrite in such a manner that minimum of treatment and handling of the material is necessary. Other objects and characteristics of the process and products, according to my invention, will become apparent from the following description thereof.

I have found that a small amount of hydraulic cement (3–5%) mixed with the starting material produces a basic medium (calcium hydroxide), which causes a rapid solution and supersaturation of the anhydrite in the mixing water, resulting, with the evaporation of the water, in a vigorous, non-hydrating recrystallization of the anhydrite and therewith the setting and binding. The fact that the recrystallized material remains anhydrous is also the reason for the hardness, compression and tensile strength exceeding by far the corresponding values for plaster of Paris and other similar products.

The cements usable in my process comprise all binders which, like Portland cement and others, belong to the group of hydraulic binders which, in addition to lime in amounts above 50%, also contain clay and silica, whereby, through the action of the water, the lime either totally or in part is temporarily transformed into calcium hydroxide.

According to my invention, the mineral anhydrite is ground to pass a 175 mesh screen and mixed with 3–5% cement to form a non-hydrating setting and binding material. The water factor for this material varies with its uses. The set and dried mass remains anhydrous calcium sulphate, the water content being about 3% of the anhydrite by weight.

In support of my statement that the setting of this material is not due to hydration of the calcium sulphate, the following test results are given.

Mixture by weight:
    220 parts natural mineral anhydrite passing 175 mesh (+5% Portland cement)
    55 parts water mixed into above 275 parts fresh mix
    227 parts after setting and drying 7 days 48 parts water evaporated.

The compression and tensile strength of the mass is governed by the amount of water used in mixing. Extensive research showed that the material mixed with 18% water (earth moist) gave the highest test results, compression resistance of 3500 pounds per square inch, tensile strength 250 pounds per square inch, and hardness about 3, after 7 days' drying in room temperature. Strength values obtained when mixed for conventional uses with mortar sand, expanded vermiculite, Haydite and perlite, up to a ratio of 1:3 by weight, were found to be superior to those obtained with common commercial plasters. When used for purposes requiring maximum strength and hardness, the water factor should be held to a minimum, 18–25% by weight, e. g. for prefabricated building blocks, stones, plates, flooring and floor tiles and surfaces exposed to abrasive wear. When used for non-weight-bearing purposes, or when hardness is less important, water is used in amounts needed to achieve the required workability, e. g. scratch, brown and finish coat plaster, mortar and similar mixes.

Setting time for the material ranges from less than one hour to eight hours, depending on the amount of water and the aggregate used.

In addition to the aggregates mentioned above, special properties can be conferred by use of other modifying agents, such as mineral pigments, light ashes, organic fillers and fibers.

Among other outstanding characteristics of this material, in addition to its high compression resistance, tensile strength and hardness, is its stability towards oils and acids and other chemicals, which makes it useful for industrial floors, laboratory table tops, etc.; its dimensional stability upon setting, in contrast to plasters which set with hydration; its stability at high temperatures, due to the absence of crystalline water of hydration which characterizes hydrated plasters; and the absence of deleterious effects of freezing and thawing.

From the above description, it is obvious that various modifications may be made in the use of this new product without departing from the purpose of the invention. All of the additions may be modified within the scope of the following claims.

I claim:

1. A new, anhydrous quick-setting composition of matter, consisting of finely ground mineral anhydrite, to pass 175 mesh screen, and 3 to 5% of hydraulic cement.

2. A process of manufacturing an anhydrous setting and binding material which consists in adding an amount of 3 to 5% by weight of an hydraulic cement to the natural mineral anhydrous sulfate, anhydrite, ground to pass 175 mesh screen.

3. The process of manufacturing an anhydrous setting and binding material set forth in claim 2, in which Portland cement is added to the natural anhydrite.

HERMAN WEBER.

REFERENCES CITED

The following references are of record in the file of this patent:

UNITED STATES PATENTS

| Number | Name | Date |
| --- | --- | --- |
| 1,951,691 | Coxon | Mar. 20, 1934 |
| 1,972,527 | Lefebure | Sept. 4, 1934 |